United States Patent
Dreher et al.

(10) Patent No.: US 6,459,221 B1
(45) Date of Patent: Oct. 1, 2002

(54) METHOD FOR POWERING A POLYPHASED ELECTRIC MOTOR WITH ELECTRONIC SWITCHING, AND SUPPLY CIRCUIT FOR IMPLEMENTING SAME

(75) Inventors: Thomas Dreher, Caen; Michel Guinet, Cambes en Plaine; Michel Philippe Jose le Roux, Moulines, all of (FR)

(73) Assignee: Moulinex S.A., Cormelles le Royal (FR)

(*) Notice: Subject to any disclaimer, the term of this patent is extended or adjusted under 35 U.S.C. 154(b) by 0 days.

(21) Appl. No.: 09/701,832
(22) PCT Filed: May 28, 1999
(86) PCT No.: PCT/FR99/01259
§ 371 (c)(1),
(2), (4) Date: Feb. 7, 2001
(87) PCT Pub. No.: WO99/65139
PCT Pub. Date: Dec. 16, 1999

(30) Foreign Application Priority Data

Jun. 5, 1998 (FR) .............................. 98 07117

(51) Int. Cl.[7] .............................................. H02P 7/00
(52) U.S. Cl. ........................................ 318/254; 318/439
(58) Field of Search .................................. 318/138, 254, 318/439, 701, 685

(56) References Cited

U.S. PATENT DOCUMENTS 5,461,295 A * 10/1995 Horst ........................ 318/254
5,767,638 A * 6/1998 Wu et al. ................... 318/254

FOREIGN PATENT DOCUMENTS

| FR | 2 744 577 | 8/1997 |
| WO | WO 94/28618 | 12/1994 |
| WO | WO 97/39522 | 10/1997 |

* cited by examiner

Primary Examiner—Khanh Dang
(74) Attorney, Agent, or Firm—Young & Thompson

(57) ABSTRACT

A process for supplying a polyphase motor with electronic switching (M) from a voltage supply source (A), includes a passive electric filter downstream of the supply source (A), a conversion of the voltage supplied by the source (A) to supply the phases of the motor (M), using an assembly of controllable switches having either a passing condition or blocking condition, where each combination of conditions of the switches defines a conversion configuration. The process regulates the supply current about a reference current (Iref), and a sequence of magnetization and de-magnetization cycles of the phases of the motor (M) initiated by magnetization or de-magnetization references of the phases. During at least one period of sequencing per cycle, several pairs of conversion configurations are selected so that the mean current conforms as close as possible to the reference current (Iref).

14 Claims, 16 Drawing Sheets

| ONE DIRECTION | U | V | W |
|---|---|---|---|
| 1 | $+I_U + \alpha I_V + I_W$ | $+I_U + I_V + \alpha I_W$ | $+\alpha I_U + I_V + I_W$ |
| 2 | $+I_U - \alpha I_V + I_W$ | $+I_U + I_V - \alpha I_W$ | $-\alpha I_U + I_V + I_W$ |
| 3 | $+I_U - I_V + \alpha I_W$ | $+\alpha I_U + I_V - I_W$ | $-I_U + \alpha I_V + I_W$ |
| 4 | $+I_U - I_V - \alpha I_W$ | $-\alpha I_U + I_V - I_W$ | $-I_U - \alpha I_V + I_W$ |
| 5 | $+\alpha I_U - I_V - I_W$ | $-I_U + \alpha I_V - I_W$ | $-I_U - I_V + \alpha I_W$ |
| 6 | $-\alpha I_U - I_V - I_W$ | $-I_U - \alpha I_V - I_W$ | $-I_U - I_V - \alpha I_W$ |

FIG. 5A

| THE OTHER DIRECTION | U | V | W |
|---|---|---|---|
| 1 | $+I_U + I_V + \alpha I_W$ | $+\alpha I_U + I_V + I_W$ | $+I_U + \alpha I_V + I_W$ |
| 2 | $+I_U + I_V - \alpha I_W$ | $-\alpha I_U + I_V + I_W$ | $+I_U - \alpha I_V + I_W$ |
| 3 | $+I_U + \alpha I_V - I_W$ | $-I_U + I_V + \alpha I_W$ | $+\alpha I_U - I_V + I_W$ |
| 4 | $+I_U - \alpha I_V - I_W$ | $-I_U + I_V - \alpha I_W$ | $-\alpha I_U - I_V + I_W$ |
| 5 | $+\alpha I_U - I_V - I_W$ | $-I_U + \alpha I_V - I_W$ | $-I_U - I_V + \alpha I_W$ |
| 6 | $-\alpha I_U - I_V - I_W$ | $-I_U - \alpha I_V - I_W$ | $-I_U - I_V - \alpha I_W$ |

FIG. 5B

| THE TWO DIRECTIONS | U | V | W |
|---|---|---|---|
| 1 | $+I_U + \alpha I_V + \alpha I_W$ | $+\alpha I_U + I_V + \alpha I_W$ | $+\alpha I_U + \alpha I_V + I_W$ |
| 2 | $+I_U - \alpha I_V - \alpha I_W$ | $-\alpha I_U + I_V - \alpha I_W$ | $-\alpha I_U - \alpha I_V + I_W$ |
| 3 | $+\alpha I_U - I_V - I_W$ | $-I_U + \alpha I_V - I_W$ | $-I_U - I_V + \alpha I_W$ |
| 4 | $-\alpha I_U - I_V - I_W$ | $-I_U - \alpha I_V - I_W$ | $-I_U - I_V - \alpha I_W$ |

FIG. 5C

| ONE DIRECTION | U | V | W |
|---|---|---|---|
| 1 | $+I_U + \alpha I_V + I_W$ | $+I_U + I_V + \alpha I_W$ | $+\alpha I_U + I_V + I_W$ |
| 2 | $+I_U - \alpha I_V + I_W$ | $+I_U + I_V - \alpha I_W$ | $-\alpha I_U + I_V + I_W$ |
| 3 | $+I_U - I_V + \alpha I_W$ | $+\alpha I_U + I_V - I_W$ | $-I_U + \alpha I_V + I_W$ |
| 4 | $+I_U - I_V - \alpha I_W$ | $-\alpha I_U + I_V - I_W$ | $-I_U - \alpha I_V + I_W$ |
| 5 | $+\alpha I_U - I_V - I_W$ | $-I_U + \alpha I_V - I_W$ | $-I_U - I_V + \alpha I_W$ |
| 6 | $-\alpha I_U - I_V - I_W$ | $-I_U - \alpha I_V - I_W$ | $-I_U - I_V - \alpha I_W$ |

FIG. 6

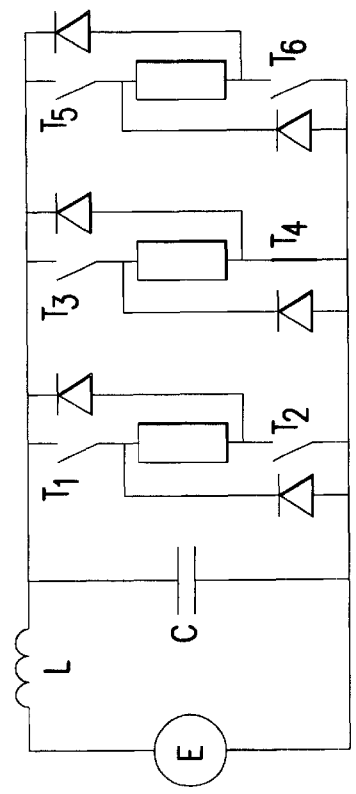
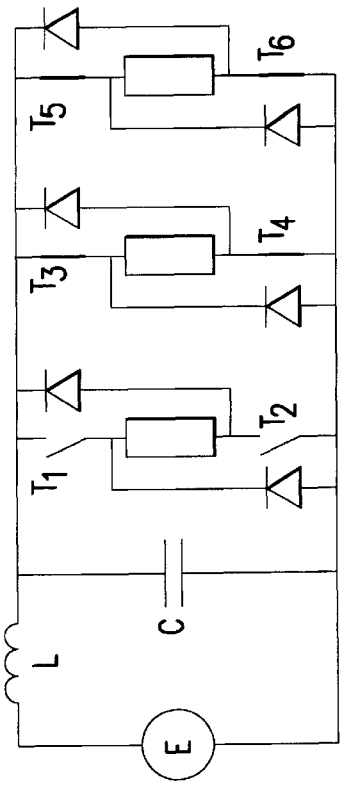
FIG. 7A
FIG. 7B
COUPLE OF CONFIGURATIONS V5
COUPLE OF CONFIGURATION W3

COUPLE OF CONFIGURATIONS W4
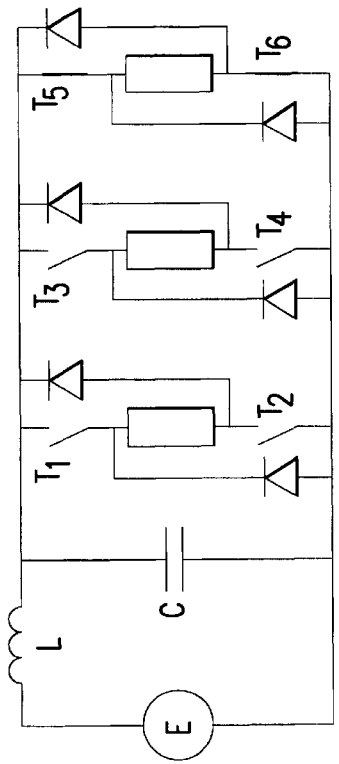
FIG. 7C
COUPLE OF CONFIGURATION W5
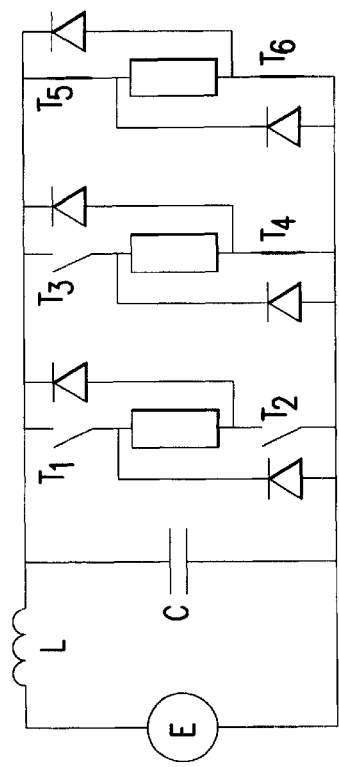
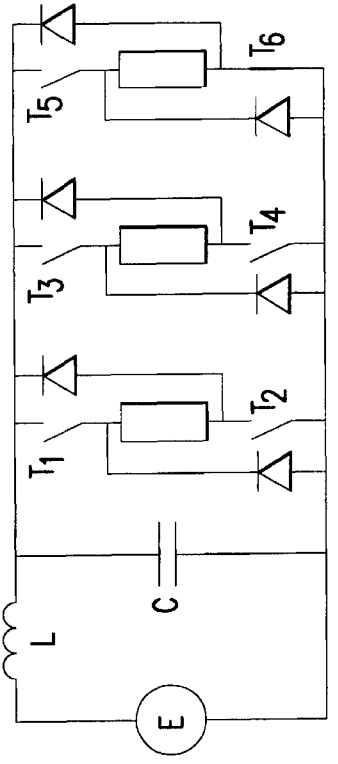
FIG. 7D
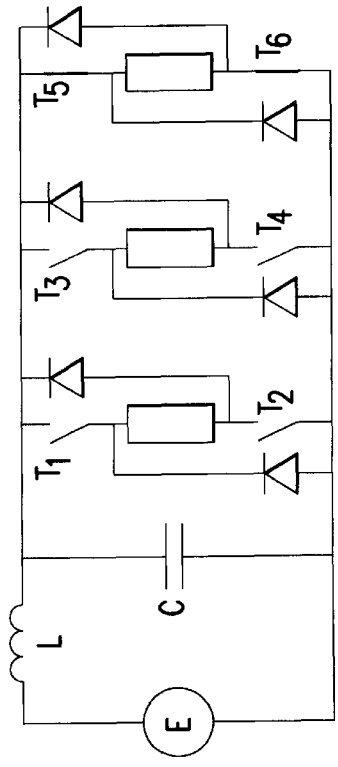

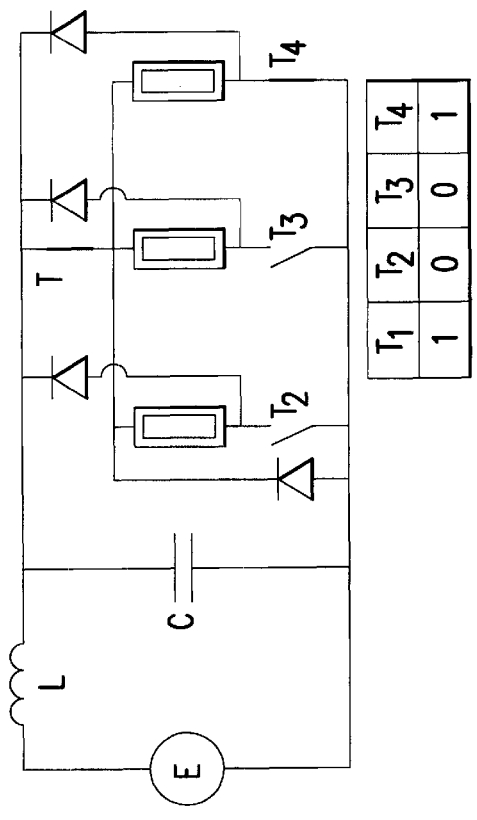
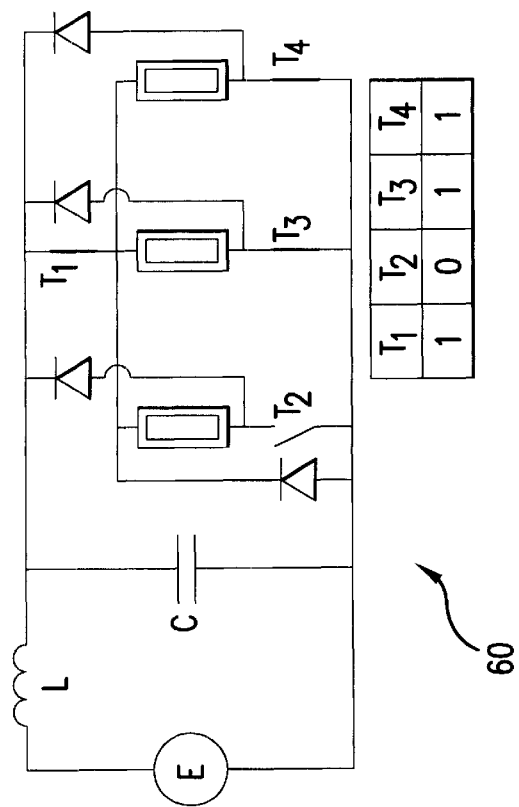
FIG. 8

| ONE DIRECTION | U | V | W |
|---|---|---|---|
| 1 | $+I_U + \alpha I_W$ | $+\alpha I_U + I_V$ | $+\alpha I_V + I_W$ |
| 2 | $+\alpha I_U - \alpha I_V - \alpha I_W$ | $-\alpha I_U + \alpha I_V - \alpha I_W$ | $-\alpha I_U - \alpha I_V + \alpha I_W$ |

FIG. 9A

| THE OTHER DIRECTION | U | V | W |
|---|---|---|---|
| 1 | $+I_U + \alpha I_V$ | $+I_V + \alpha I_W$ | $+\alpha I_U + I_W$ |
| 2 | $+\alpha I_U - \alpha I_V - \alpha I_W$ | $-\alpha I_U + \alpha I_V - \alpha I_W$ | $-\alpha I_U - \alpha I_V + \alpha I_W$ |

FIG. 9B

| THE TWO DIRECTIONS | U | V | W |
|---|---|---|---|
| 1 | $+I_U + \alpha I_V + \alpha I_W$ | $+\alpha I_U + I_V + \alpha I_W$ | $+\alpha I_U + \alpha I_V + I_W$ |
| 2 | $+\alpha I_U - \alpha I_V - \alpha I_W$ | $-\alpha I_U + \alpha I_V - \alpha I_W$ | $-\alpha I_U - \alpha I_V + \alpha I_W$ |

FIG. 10

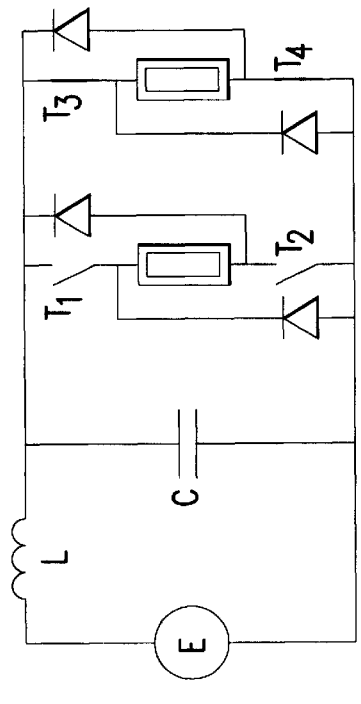
FIG. 11
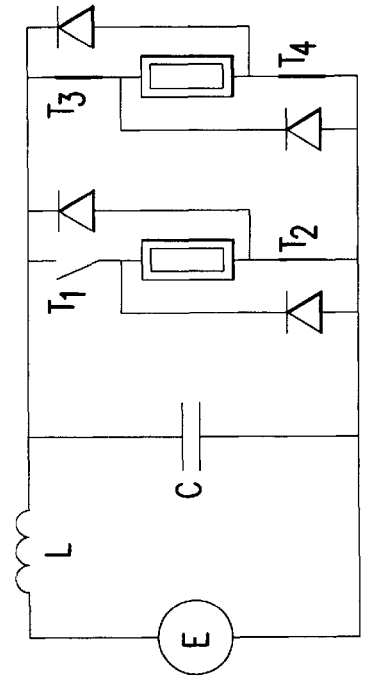
FIG. 13
FIG. 12

FIG. 15

| ONE DIRECTION | $u^+$ | $v^+$ | $u^-$ | $v^-$ |
|---|---|---|---|---|
| 1 | $+1I_U^+ + \alpha I_V^-$ | $+\alpha I_U^+ + 1I_V^+$ | $+1I_U^- + \alpha I_V^+$ | $+\alpha I_U^- + 1I_V^-$ |
| 2 | $+1I_U^+ - \alpha I_V^-$ | $-\alpha I_U^+ + 1I_V^+$ | $+1I_U^- - \alpha I_V^+$ | $-\alpha I_U^- + 1I_V^-$ |
| 3 | $+\alpha I_U^+ - 1I_V^-$ | $-1I_U^+ + \alpha I_V^+$ | $+\alpha I_U^- - 1I_V^+$ | $-1I_U^- + \alpha I_V^-$ |
| 4 | $-\alpha I_U^+ - 1I_V^-$ | $-1I_U^+ - \alpha I_V^+$ | $-\alpha I_U^- - 1I_V^+$ | $-1I_U^- - \alpha I_V^-$ |

FIG. 16

| THE OTHER DIRECTION | $u$ | $v$ | $u$ | $v$ |
|---|---|---|---|---|
| 1 | $+1I_U^+ + \alpha I_V^+$ | $+\alpha I_U^- + 1I_V^-$ | $+1I_U^- + \alpha I_V^-$ | $+\alpha I_U^+ + 1I_V^-$ |
| 2 | $+1I_U^+ - \alpha I_V^+$ | $-\alpha I_U^- + 1I_V^-$ | $+1I_U^- - \alpha I_V^-$ | $-\alpha I_U^+ + 1I_V^-$ |
| 3 | $+\alpha I_U^+ - 1I_V^+$ | $-1I_U^- + \alpha I_V^-$ | $-1I_U^- + \alpha I_V^-$ | $-1I_U^+ + \alpha I_V^-$ |
| 4 | $-\alpha I_U^+ - 1I_V^+$ | $-1I_U^- - \alpha I_V^-$ | $-1I_U^- - \alpha I_V^-$ | $-1I_U^+ - \alpha I_V^-$ |

METHOD FOR POWERING A POLYPHASED ELECTRIC MOTOR WITH ELECTRONIC SWITCHING, AND SUPPLY CIRCUIT FOR IMPLEMENTING SAME

BACKGROUND OF THE INVENTION

The present invention relates to a process for supplying a polyphase electric motor with electronic switching. It also relates to a supply circuit for practicing this process.

The supply of a polyphase motor with electronic switching from the monophase sector network generally uses a rectifier stage and a converter stage comprising electronic switches controlled from references and positional information from detectors, for supplying the different phases of this motor. The present invention relates more particularly but not exclusively to the case of variable reluctance motors with electronic switching supplied by a power converter.

It is to be noted that in present processes for supplying a motor with electronic switching, the current delivered by the supply is subject to disturbances which can be at multiple frequencies in the frequency sector. These disturbances can lead to exceeding values of current harmonics permitted by the standard CEI 61000-3-2. At present, this problem is solved by filtering the supply current so as to get rid of current harmonics greater than the frequency of the sector. A filter can for example be inserted, passive (based on L, C filters) or active (of the PFC type: "Power Factor Correction"), between the rectifier stage and the converter stage. The addition of a PFC filter upstream of the converter stage leads to significant and prohibitive increase in the cost of the electronics, when the powers to be controlled exceed several hundreds of watts.

There is known from FR2 744 577 in the name of the present applicant, a process to supply a polyphase electric motor with variable reluctance and electronic switching from a source of rectified voltage, comprising for each phase, magnetization sequences during which the rectified voltage is applied to the phase, demagnification sequences during which the reverse of the rectified voltage is applied to the phase, a detection of disturbances affecting the current delivered by the rectified voltage source, and in response to such a detection, sequences of free wheeling during which the magnetic energy presently stored in at least one of the phases is substantially maintained in the latter.

However, it must be pointed out that the present supply processes are not completely satisfactory because they do not permit a wide latitude of operation of the motor or require costly filtering devices. In particular, there is not at present a satisfactory economic solution to provide an effective control of the current supply of the converter.

SUMMARY OF THE INVENTION

The object of the invention is to overcome these drawbacks by providing a process to supply an electronically switched motor, which will have greater flexibility of control than the present processes, to the end of satisfying the present constraints as to material for electromagnetic compatibility without having need to resort to active filtering devices such as PFC.

The above objects are achieved with a process to supply a polyphase electric motor with electronic switching from a voltage supply source, comprising:

passive electrical filtration downstream of the supply source to attenuate rapid fluctuations of the supply current delivered by said source, conversion of the voltage supplied by the source to supply the phases of the motor, using an assembly of controllable switches having either a passive condition, or a blocked condition, each combination of conditions of the switches defining a conversion configuration, a regulation of the supply current about a current reference, using alternation between two conversion configurations, a determination of the mean supply current, a sequencing of magnetization and demagnetization cycles of the phases of the motor, initiated by magnetization or demagnetization references of the phases, each cycle comprising a plurality of periods of sequencing within each of which said magnetization or demagnetization references do not change.

According to the invention, this process moreover uses, during at least one of the sequencing periods per cycle, several couples of conversion configurations such that the mean supply current respects as much as possible the reference current.

Thus, this supply process provides at least cost an effective control of the supply current, contributing to an optimization of the power factor and to the satisfaction of the constraints of electromagnetic compatibility. Moreover, the supply process according to the invention contributes to a substantial reduction of the acoustic noise generated by the motor thus supplied.

The sequencing period is here defined as a period of time in the course of which the orders or standards sent by a sequencer do not change. It is to be noted that within a period of sequencing, two couples of successive configurations can have an identical or equivalent configuration.

In a preferred embodiment of the process according to the invention, the latter comprises moreover a selection of a couple of configurations arranged to permit the introduction of two supply current values enclosing as nearly as possible the reference current and to take account of the magnetization or demagnetization references of the phases.

The supply process according to the invention can moreover preferably comprise a series of couples of configurations pre-defined as a function of the magnetization or demagnetization references.

There can also be provided a passage from one couple of configurations in use, to a following couple of configurations, when the couple of configurations in use no longer guarantees a production of two supply currents straddling the reference current.

It is advantageous to provide, at each start of a period, a determination of a first couple of configurations belonging to the series of couples pre-defined as a function of the last couple of active configurations of the preceding period, then a use of this first couple of configurations.

One of the configurations of the selected couple of configurations can for example comprise at least one free wheel condition.

In a particular embodiment of the supply process according to the invention, it can be provided that within a period of sequencing, two successive couples of configurations have an identical or equivalent configuration, producing substantially identical differences of potential in the motor phases.

In a first embodiment, the voltage source is a rectified AC voltage source and the current reference has a nearly sinusoidal rectified shape substantially in phase with the supply voltage.

In a second embodiment, the voltage source is a source of substantially constant voltage and the current reference is of substantially continuous shape.

According to another aspect of the invention, there is proposed a circuit to supply a polyphase motor with electronic switching from a source of voltage supply, this circuit using the process according to the invention and comprising:

passive electrical filtering means in series with the supply source to attenuate the rapid fluctuations of the supply current delivered by said source, a converter to supply, from the filtered supply source, the phases of the motor, this converter comprising controllable switches having either a passing condition, or a blocked condition, each combination of conditions of said switches defining a conversion configuration:

means to determine the mean supply current of the converter, means to regulate the supply current arranged to generate, as a function of a current reference and of the current measurement, a regulation logic signal permitting alternating between two couples of configurations of conversion in response to this logic signal, and a phase sequencer producing reference logic signals which define cycles of magnetization and de-magnetization of the phases, each cycle decomposing into a plurality of periods of sequencing within each of which the reference is sent by the sequencer to the assembly of phases do not change.

According to the invention, this circuit is characterized in that it moreover comprises a selection device disposed between the phase sequencer and the converter and arranged to use, during each period of sequencing defined by the phase sequencer, successively several couples of configurations such that the mean current of the converter respects as closely as possible the reference current.

The phase sequencer produces reference logic signals which define cycles of magnetization and de-magnetization of the phases as a function of the direction of rotation of the motor and of the orientation of the mean mechanical couple desired for the motor.

The selection device is preferably arranged to select the couple of configurations which permits the production of two supply current values straddling as near as possible the current reference and to take into account the magnetization or de-magnetization references of the phases.

BRIEF DESCRIPTION OF THE DRAWINGS

Other particularities and advantages of the invention will become apparent from the following description.

In the accompanying drawings, given by way of non-limiting example:

FIG. 5A is a table showing the characteristic transitions between couples of configurations in the case of a triphase non-symmetric supply with six transistors, in the direct direction of rotation;

FIG. 5B is a table showing the characteristic transitions between couples of configurations in the case of a non-symmetric triphase supply with six transistors, in the reverse direction of rotation;

FIG. 5C is a table showing the characteristic transitions between couples of configurations in the case of a symmetrical triphase supply with six transistors, in the two directions of rotation;

FIG. 6 shows an example of an effective suite of couples of configurations carried out in the case of a triphase non-symmetrical supply with six transistors, in the direct direction of rotation;

FIGS. 7A to 7D show respectively the couples of configuration V5, W3, W4 and W5 corresponding to the series of couples represented in FIG. 6;

FIG. 8 shows an example of a couple of configurations, in the case of a triphase non-symmetric supply with four transistors;

FIGS. 9A and 9B are tables representing the characteristic transitions between couples of configurations in the case of a non-symmetric triphase supply with four transistors, respectively in the direct and in the reverse directions of rotation;

FIGS. 10 is a table showing the characteristic transitions between couples of configurations in the case of a symmetrical triphase supply with four transistors, in the two directions of rotation;

FIG. 11 shows an example of a couple of configurations, in the case of a triphase supply with four transistors FIG. 12 is a table showing the characteristic transitions between couples of configurations in the case of a triphase supply with four transistors, in the two directions of rotation;

FIG. 13 is a table showing the characteristic transitions between couples of configurations in the case of a biphase supply with three transistors, in the two directions of rotation;

FIG. 15 is a table showing the characteristic transitions between couples of configurations in the case of a bi-directional biphase non-symmetric supply with eight transistors, in the direct direction of rotation;

FIG. 16 is a table showing the characteristic transitions between couples of configurations in the case of a bi-directional biphase non-symmetrical supply with eight transistors, in the reverse direction of rotation;

DESCRIPTION OF THE PREFERRED EMBODIMENTS

Figure 1:
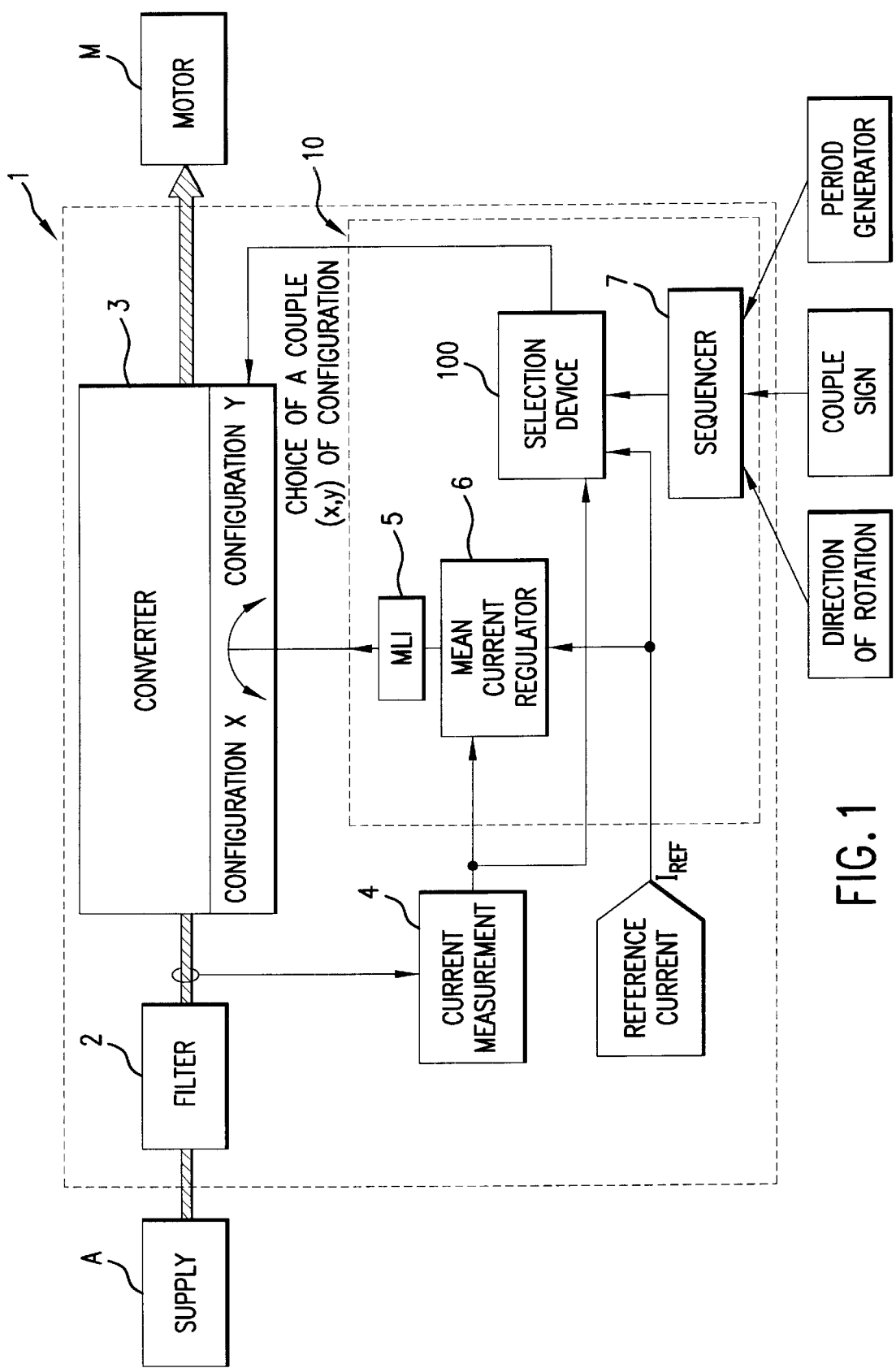
FIG. 1 is a block diagram of a supply circuit according to the invention.

There will now be described, with reference to FIG. 1, an example of embodiment of a supply circuit according to the invention. The supply circuit 1 comprises a power conversion chain comprising a filtering device 2 at the input of which is connected a supply voltage source A, and a power converter 3 of conventional structure, supplying the phases of a polyphase motor M with electronic switching. The supply circuit 1 moreover comprises a command and control circuit 10 including a mean current regulator 6, a circuit 5 for the generation of logic modulation signals applied to the converter 3, a phase sequencer 7 and a selection device 100 which carries out the choice of the couples of configurations applied to the converter 3.

In what follows, it will be assumed that the logic condition 1 corresponds to the production of a supply current greater than that produced in the logic condition 0 within a same couple of configurations.

By way of an example of practical embodiment of a supply circuit according to the invention, the filter 2 is a type (L,C) filter with, for typical values, L=1 mH and C=4.7 $\mu$F. This filter is designed such that the mean current upstream of the filter will be substantially equal to the mean current downstream of the filter.

The phase sequencer 7 receives references of the direction of rotation and of the sign of the couple, and data for period generation from for example a position detector. The regulator 6 receives measuring information 4 of the supply current from the converter 3 and reference information of current Icons, these two sets of information being also applied to the selection device 100 when it is connected to the phase sequencer 7.

Figure 2A:
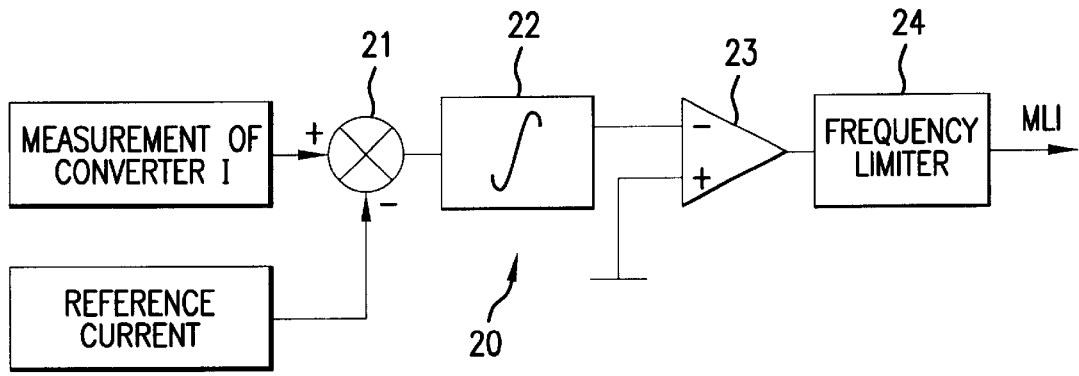
FIGS. 2A and 2B show two embodiments of mean supply current regulation of the converter.

In a preferred embodiment, the mean current regulator has preferably a first structure 20 as shown in FIG. 2A, including a subtractor component 21 between the supply current measurement of the converter and the reference current, an integrator circuit 22, a zero comparator circuit 23 and a frequency limiter 24 whose output generates directly a logic signal with an invariably cyclic ratio MLI.

Figure 2B:
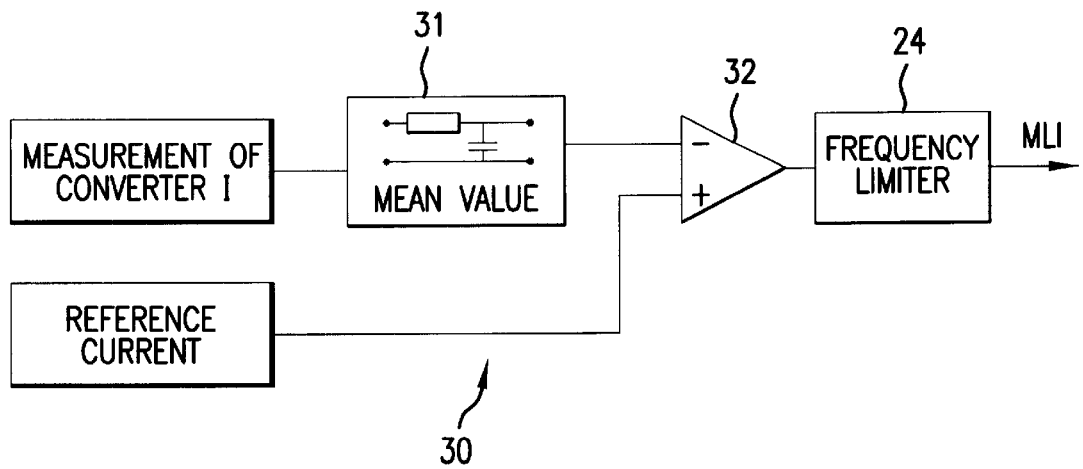

In a modified embodiment, this regulator can also have another structure shown by FIG. 2B, including an averaging circuit 31, for example of the R, C type, to supply a mean value of the supply current measurement of the converter, a comparator circuit 32 between the mean current measurement and the reference current, and a frequency limiter 24.

Figure 3:
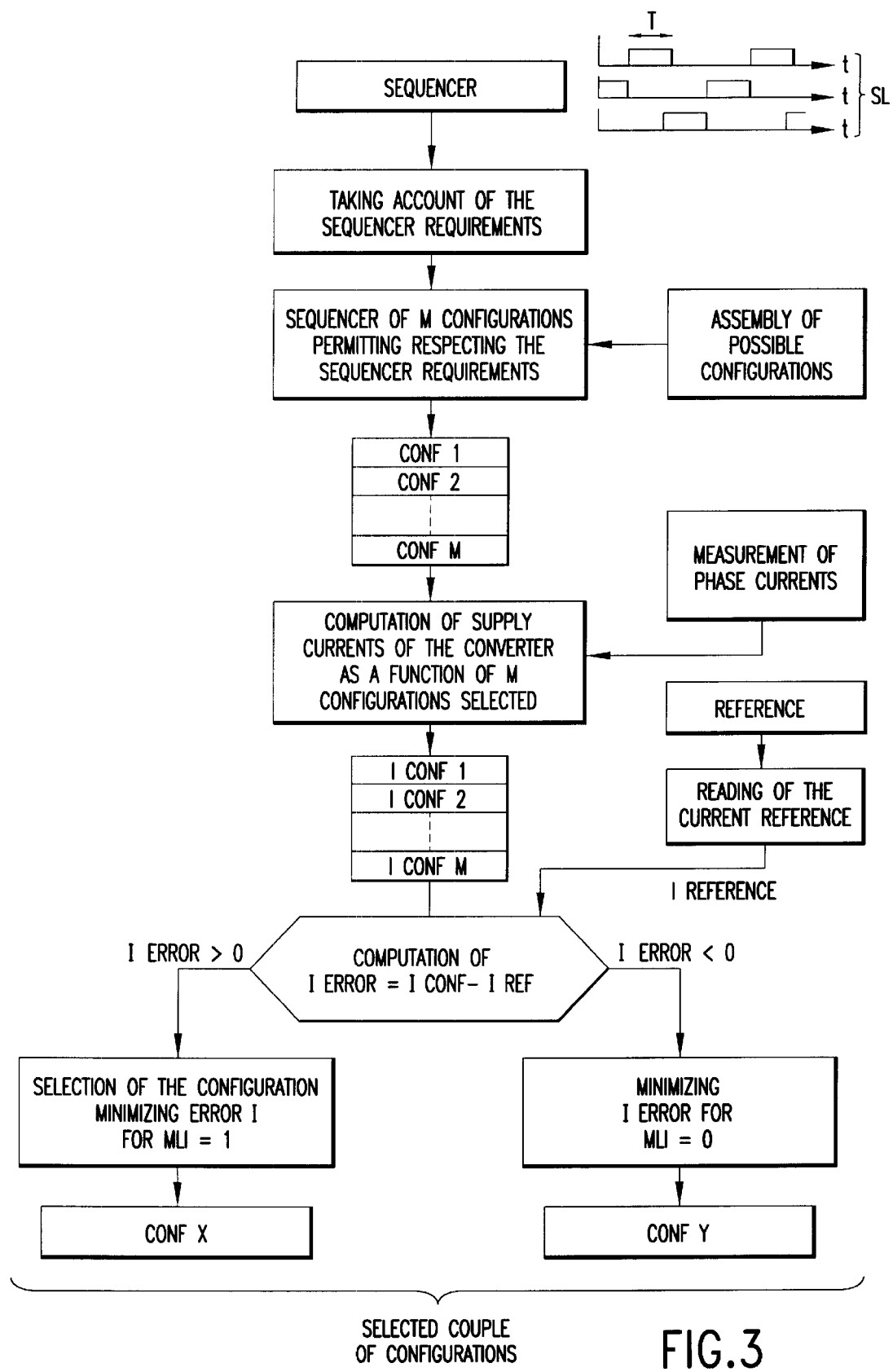
FIG. 3 is an organogram corresponding to the practice of the supply process according to the invention, in its most general form.

There will now be described the essential steps of the supply process according to the invention as to its most general practice, within the selection device, with reference to FIG. 3.

The sequencer 7 generates an assembly SL of logic signals whose durations define sequency periods T within which the magnetization and de-magnetization references do not change. The selection device 100 (FIG. 1) takes account of the logic demands and selects, from among an assembly of possible configurations, an assembly of M configurations Conf1, Conf2, . . . , ConfM permitting observing the requirements of the sequencer. For each of the selected configurations, the supply currents Iconf1, Iconf2, . . . , IconfM of the converter are calculated, by using particularly phase measurements of currents. There are then carried out computations of current errors Ierror equal to the difference between the calculated current Iconf and a current reference Iref. If the current error is positive, the minimizing configuration |error| is selected and this configuration is associated with the logic condition 1 of the control MLI. If the current error is negative, the minimizing configuration |error| will be associated at the logic level 0 of the control MLI. The two configurations thus selected constitute a couple of configuration [Conf X, Conf Y].

Figure 4:
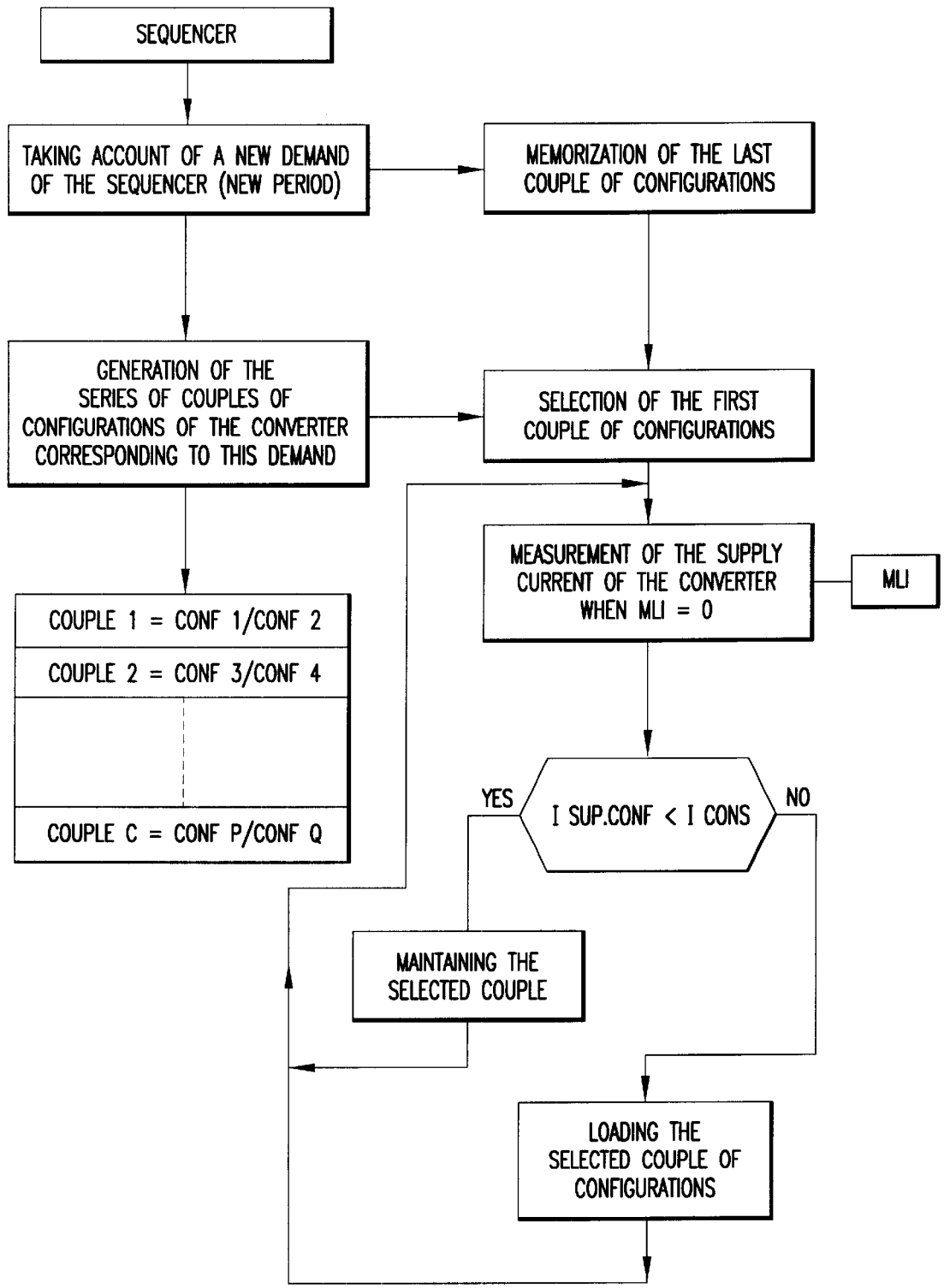
FIG. 4 is an organogram corresponding to a particular practice of the supply process according to the invention.

In a practical embodiment of the supply process according to the invention corresponding to a simplified version and shown in FIG. 4, at each taking account of a new requirement for the sequencer 7 corresponding to a new period, the last couple of configurations used is memorized. The series of couples of configurations predefined in the memory is generated, which is compatible with this new requirement: couple 1=Conf1/Conf2, Couple 2=Conf3/Conf4, . . . , Couple C=Conf P/Conf Q. The first couple of configurations of this series is selected, and the supply current of the converter 3 is measured when the command MLI is at the logic level 0. If the supply current of the converter is less than the reference current Iref, the selected couple is maintained. On the contrary, if the supply current is greater than the reference current, the couple of selected configurations is changed by taking into the series of couples, the following couple.

There will now be given several practical examples of selection of couples of configurations corresponding to conventional power converter structures and to usual modes of supplying variable reluctance motors, with reference to FIGS. 5 to 13 and 17 to 19. It is to be noted that in these figures, there will be used systematically common references for identical components or couples.

There will first be considered, with reference to FIGS. 5A to 7D, a power converter 50 with six transistors T1–T6 to supply a triphase motor. This power converter is connected upstream to a continuous voltage source E and comprises a filtering stage of the type (L,C). This converter has a conventional structure with three asymmetric half bridges each provided with two free wheel diodes, and takes a three-phase supply.

A first table, shown in FIG. 5A, shows the assembly of the couples of configurations used in the direct direction for this supply structure. This table, comprising three columns corresponding to the three phases U, V, W of the supplied motor and six rows corresponding to characteristic sequences, thus assembles 18 couples of configurations corresponding each to one specific combination of conditions of the transistors of the converter and a control MLI whose cyclic ratio can vary from 0 to 100% and is shown by the coefficient $\alpha$. In each case of this table, there is indicated the expression of the supply current of the converter.

Thus, in the case (W, 4), the supply current is expressed by the relationship: $-Iu-\alpha Iv+Iw$ in which Iu, Iv and Iw represent respectively the currents introduced into the phases U, V and W and in which the coefficient $\alpha$ can vary continuously between 0 and 1. The coefficient $\alpha$ equal to 1 can correspond either to a magnetization (+I), or to a de-magnetization (+I), whilst a coefficient $\alpha$ of zero corresponds to a free wheel condition.

The passage from one column to another takes place at each new period of sequencing and is therefore controlled by the sequencer 7. Within a column, the passage from one line to the following line is triggered by the selection device when it detects that the couple of configurations in progress is no longer appropriate.

The arrows inscribed in each table indicate the choice of the first couple of configurations during a change of period. It is to be noted that during each transition of couple of configurations, there is continuity of supply current by means of the converter.

During a reversal of the direction required by the sequencer, reference will be had to the corresponding table shown for example by FIG. 5B. It is possible to define the so-called symmetric sequences that can be used in the two directions of rotation. In this case, reference is had to a single table shown by FIG. 5C.

There will now be described a practical example of embodiment of a series of couples of configurations in the direct direction of rotation, shown by Figure and FIGS. 7A to 7D.

There will be considered for example a first couple of configurations called V5 shown in column V and in line 5 of the table of FIG. 6 by the current expression −Iu+αIv−Iw. In this first couple of configurations, it is the phase V of the motor which is magnetized by modulation MLI whilst the two other phases U and W de-magnetize. The low transistor T4 of the branch V of the converter is maintained in passing condition whilst the high transistor T3 is controlled by modulation MLI (FIG. 7A).

When the sequencer 7 commands a new period of sequencing corresponding to a switching of the phase V to the phase W, the table of FIG. 6 indicates by a suitable arrow the passage of the couple V5 to the couple W3 shown in FIG. 7B. In this second couple of configurations, the phase U demagnetizes, the phase W is continuously supplied, whilst the phase V is subject to magnetization controlled by control MLI of the high transistor T3. The passage of this second couple of configurations W3 to the couple of configurations W4 following in the same column of the table, is controlled by the selection device as a function of conditions of minimization of the current error. In this new couple of configurations W4 (FIG. 7C), the high transistor T3 of the branch V is maintained open, whilst the low transistor T4 is controlled in MLI mode, which places the winding V in a demagnetization situation by controlled free wheeling.

It can be noted that it is in this case possible to invert the commands of the transistors T3 and T4, which produces a couple of equivalent configurations. We then pass, on order of the selection device 100, to the couple of configurations W5 (FIG. 7D) in which the two phases U and V are fully de-magnetized and the phase W is in a condition of controlled magnetization by control MLI of the high transistor T5 of the branch W. One normally remains in this couple of configurations until the sequencer 7 commands a new period of sequencing corresponding to a switching of the phase W to the phase U.

There can also be applied the supply process according to the invention to a power converter 60 comprising four transistors and four diodes according to a conventional structure shown in FIG. 8. The couple of configurations corresponding to this figure comprises a first configuration associated with the logic conditions [1011] of the transistors T1–T4 and a second configuration associated with the logic conditions [1001]. In this supply mode, only six couples of configurations are traversed for each direction of rotation, as is shown in FIGS. 9A and 9B. There can thus be provided a symmetric triphase supply with this converter structure with four transistors, with reference to the table of couples of configuration shown in FIG. 10.

There can also be used the process according to the invention to supply a bi-phase motor with electronic switching. In a first example of application to a power converter 70 constituted of two asymmetric half bridges and corresponding to a supply that is necessarily symmetrical, with reference to FIGS. 11 and 12, the series of couples of configurations comprises, for the two directions of rotation, eight couples of configurations which can be traversed sequentially according to transitions indicated by the arrows. The couple of configurations shown in FIG. 11 is a couple V2 to which corresponds the current expression −αIu+Iv.

There can also be envisaged a bi-phase supply mode that is necessarily symmetrical, with a mounting with three transistors, this supply mode having four couples of configuration shown in FIG. 13.

Figure 14:
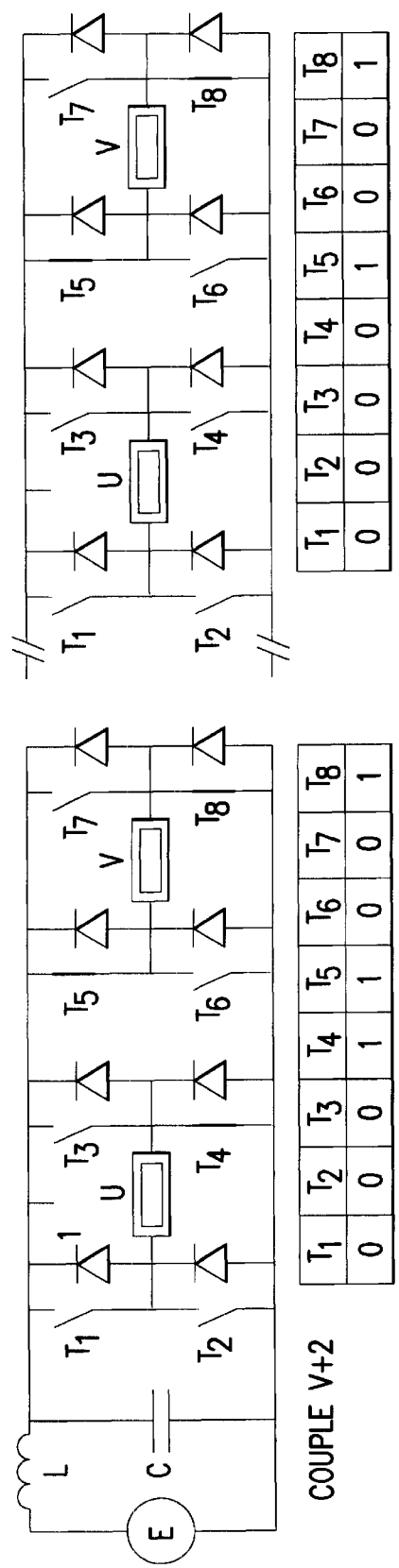
FIG. 14 shows an example of a couple of configurations, in the case of a bi-directional biphase non-symmetric supply with eight transistors.

In the case of a non-symmetrical bi-phase bidirectional supply effected by means of a converter 80 with eight transistors T1–T8 constituted of two complete bridges, which can be used to control for example a motor with electronic switching with magnets or an asynchronous motor, with reference to FIG. 14, with each direction of rotation is associated a series of 16 couples of configurations shown in FIGS. 15 and 16. In this supply mode, each winding of the bi-phase motor can be supplied in one direction or the other, which leads to four periods per cycle shown in the tables of FIGS. 15 and 16, by the four columns U+, V+, U−, V− corresponding to the different combinations of application of the supply voltage to the two phases. The couple of configurations shown in FIG. 14 can thus be designated by the couple term V+2 and corresponds to the current expression $-\alpha Iu^{+} + Iv^{+}$.

Figure 17:
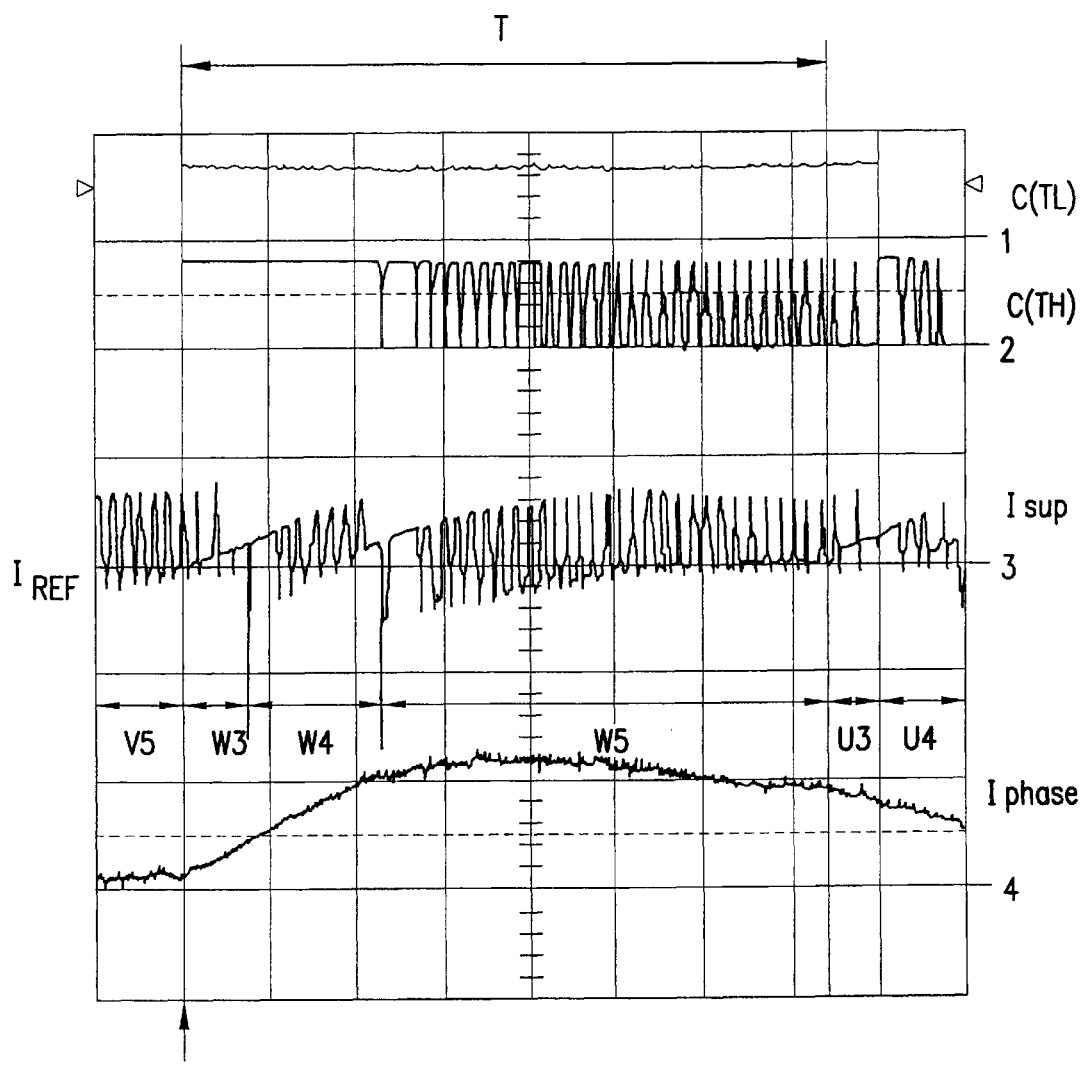
FIG. 17 is a detailed chronogram of the control signals of the controlled switches of a converter within a supply circuit according to the invention, for the current in one phase of the motor and of the supply current of the converter.
Figure 18:
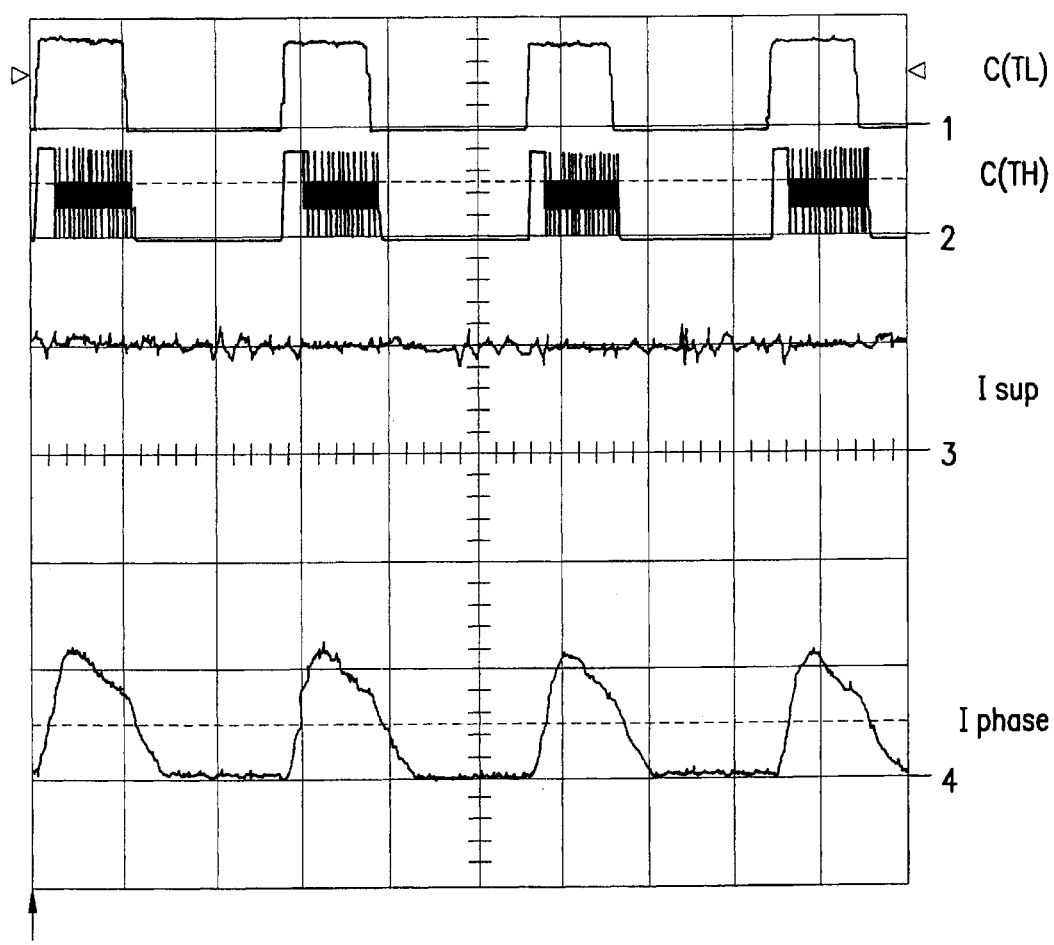
FIG. 18 is a chronogram of the control signals of the controlled switches of a converter within a supply circuit according to the invention, of the current in one phase of the motor and of the supply current, in the case of a continuous supply.
Figure 19:
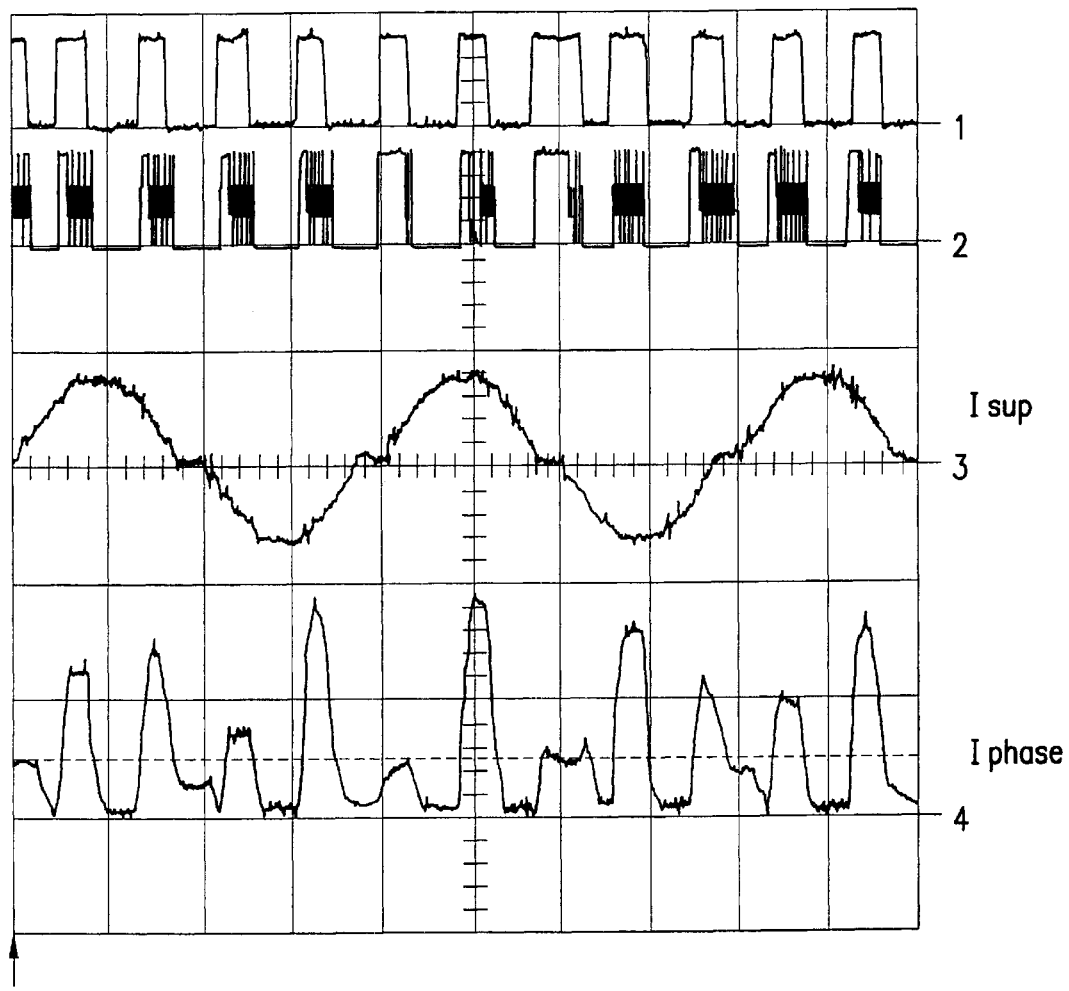
FIG. 19 is a chronogram of the control signals of the controlled switches of a converter within a supply circuit according to the invention, of the current in one phase of the motor and of the supply current, in the case of an alternating supply.

The specific performances of the supply process according to the invention are shown by the chronograms of FIGS. 17 to 19. Thus, the waveform of supply current, shown in FIG. 17 and associated with the structure of the converter shown by the table of FIG. 6, comprises a first switching zone MLI for the current, corresponding to a couple of configurations V5, a second zone triggered by switching of the phase controlled by the sequencer 7 on the occasion of a new period of sequencing and corresponding to a first couple of configurations W3 in this period, a third zone initiated when the current measured at the level MLI=0 exceeds the current reference and corresponds to the couple of configurations W4, and the fourth zone initiated when, once more, the current measured at the level MLI=0 exceeds the current reference and corresponds to the couple of configurations W5. This couple of configurations is abandoned as soon as a phase switching order is emitted by the sequencer 7 to undertake a new series of couples of configurations U3, U4, U5. This switching process of couples of configurations ensures efficacious control of the mean supply current Isup about the current reference Iref during the different supply periods despite phase switchings.

The observation of the logic signals C(TL), C(TH) for controlling the respectively high and low transistors of a same branch of the converter, in this case the branch W, indicates that the high and low transistors remain controlled by MLI beyond the end of the sequency period T.

If there is now observed, with reference to FIG. 18, wave forms characteristic of a power converter controlled by the supply process according to the invention, the control logic signal C(TL) of a low transistor IGBT has a conventional crenelated configuration, whilst the control logic signal C(TH) of the high transistor IGBT has a crenelated shape comprising a non-chopped portion and a second portion corresponding to a high frequency modulation MLI.

The current Iphase in one phase, has at the beginning of a cycle a wave shape comprising a rising non-cut front followed by a first decrease in region "under control MLI" for the rest of the duration of a control period of the low transistor, from a zone "under control" MLI at the end of the high transistor command, of a decreasing zone under control MLI outside the control windows of the two mentioned transistors, and finally a cancelling zone of the current at the end of the cycle. It is to be noted that the supply current Isup of the converter is controlled about a constant current reference, which validates the supply process according to the invention.

The validation of the supply process according to the invention is also effective in the case of a supply current that must respect a sinusoidal current reference, as shown in the chronograms of FIG. 19. It will thus be noted that the measured supply current Isup has a substantially sinusoidal appearance with a modulation MLI of relatively small amplitude, whilst the high current phase has a substantially irregular wave form.

It is to be noted that a simplified practice of the supply process according to the invention consists in carrying out a selection of a series of three couples of configurations of the converter with a single switch by modulation of pulse width (MLI). But this practice poses the problem of discontinuity of the couples of configurations during an exceptional event such as an abrupt change of the references used by the sequencer. By way of example, can be cited the case of a requirement for reversal of the direction of rotation. In this case, the sequence of couples of configurations does not have the time to take place normally and the first couple of configurations can no longer ensure the continuity of the current consumed by the converter.

Generally speaking, the supply process according to the invention can be used for any type of motor with electronic switching (MCE), synchronous motors with magnets or asynchronous motors with a squirrel cage, for example. The number of phases of the motor can be for example 2, 3, 4 or 5.

The range of typical frequencies for the signal MLI when it is applied to switches IGBT, is comprised between 10 kHz and 50 kHz.

It is to be noted that the description which has been given relates only to very particular examples of operation and that the three phases can have any energy conditions independently of their respective rows. In particular, overlapping phases can be envisaged.

Of course, the invention is not limited to the examples which have been described, and numerous arrangements can be given to these examples without departing from the scope of the invention. Thus, the number of phases and pairs of poles of the motor with electronic switching supplied by this process can be anything at all. Furthermore, the process according to the invention can have any usual law of adjustment of the angles for starting the sequences of magnetization and de-magnetization. The choice of the power switches is not limited to the IGBT transistors proposed in the description but can include any other transistor technology. Moreover, the control logic of the high and low switches can of course be permutated.

What is claimed is:

1. A process for supplying a polyphase motor (M) with electronic switching from a source of voltage supply (A), comprising the steps of:
   passive electrical filtering downstream of the voltage supply (A) to attenuate rapid fluctuations of a supply current delivered by said voltage source (A),
   converting a voltage supplied by the voltage source (A) to supply phases of the motor (M), using an assembly of controllable switches having either a passing condition or a blocking condition, each combination of conditions of said switches defining a conversion configuration,
   regulating the supply current about a reference current (Iref) by alternating between two of the conversion configurations,
   determining the mean supply current during the converting step,
   sequencing of magnetization and de-magnetization cycles of the phases of the motor (M) initiated by magnetization and de-magnetization references of the phases, each of the cycles comprising a plurality of sequencing periods within each of which a respective said magnetization or de-magnetization reference does not change, and
   using, during at least one of the sequencing periods per cycle, several pairs of the conversion configurations such that the mean supply current corresponds as closely as possible to the reference current (Iref).

2. The process according to claim 1, further comprising the step of selecting pairs of the conversion configurations (Conf X, Conf Y) arranged to permit the production of two supply current values straddling as nearly as possible the reference current (Iref) and to take into account the magnetization and de-magnetization references of the phases.

3. The process according to claim 2, further comprising the step of predefining a series of pairs of the conversion configurations as a function of the magnetization or de-magnetization references.

4. The process according to claim 3, further comprising the step of passing from one pair of the conversion configurations to a following pair of the conversion configurations, when the one pair of configurations no longer produces two supply currents straddling the reference current (Iref).

5. The process according claim 3, at each start of a period, further comprising the step of determining a first pair of the conversion configurations belonging to the series of predefined pairs as a function of the last pair of conversion configurations of the preceding period, followed by the step of using this first pair of the conversion configurations.

6. The process according to claim 2, wherein one of the pairs of the conversion configurations selected comprises at least one free wheel condition.

7. The process according to claim 2, wherein within a period of sequencing, two successive pairs of the conversion configurations have an equivalent configuration producing substantial identical potential differences in the phases of the motor.

8. The process according to claim 1, wherein the voltage source (A) is a source of rectified alternating voltage and the reference current (Iref) has a nearly sinusoidal rectified shape substantially in phase with the supply voltage.

9. The process according to claim 1, wherein the voltage source (A) is a substantially constant voltage source and the reference current (Iref) is of substantially continuous shape.

10. A circuit (1) for supplying a polyphase motor with electronic switching (M) from a voltage supply source (A), comprising:
   means for passive electrical filtering (2) in series with the supply source (A) to attenuate rapid fluctuations of a supply current delivered by said supply source (A),
   a converter (3) for supplying, from the filtered supply source, phases of the motor (M), said converter (3) comprising controllable switches having either a passing condition or a blocking condition, each combination of conditions of said switches defining a conversion configuration,
   means (4) for determining a mean supply current of the converter (3),
   means (6) for regulating the supply current and generating, as a function of a reference current (Iref) and of the supply current, a regulation logic signal permitting alternating between two conversion configurations (Conf X, Conf Y) in response to this logic signal,
   a phase sequencer (7) producing reference logic signals which define cycles of magnetization and de-magnetization of the phases, each of the cycles decomposing into a plurality of periods of sequencing within each of which the references sent by the sequencer (7) to the phases do not change, and a selection device (100) disposed between the phase sequencer (7) and the converter (3) and arranged to use, during at least one of the sequencing periods per cycle defined by the phase sequencer (7), successively several conversion configuration pairs such that the mean current of the converter (3) conforms as nearly as possible to the reference current (Iref).

11. The circuit (1) according to claim 10, wherein the selection device (100) selects the conversion configuration pair which permits the production of two supply current values straddling as nearly as possible the reference current (Iref), taking into account the respective magnetization and de-magnetization references of the phases.

12. The circuit (1) according to claim 10, wherein the selection device (100) uses a series of conversion configuration pairs predefined as a function of the magnetization or de-magnetization references.

13. The circuit (1) according to claim 10, wherein the selection device (100) controls passage of one of the conversion configuration pairs in use, to a following one of the conversion configuration pairs, when the conversion configuration pair in use no longer guarantees a production of two supply currents straddling the reference current (Iref).

14. The circuit (1) according to claim 10, wherein the selection device (100) determines, at each start of a period, a first pair of the conversion configurations belonging to the series of pairs predefined as a function of the last pair of conversion configurations of the preceding period, and then uses this first pair of conversion configurations.

* * * * *